United States Patent [19]
Estes

[11] Patent Number: 5,189,416
[45] Date of Patent: Feb. 23, 1993

[54] CHORDAL KEYBOARD METHOD AND APPARATUS

[75] Inventor: Mark D. Estes, Austin, Tex.

[73] Assignee: Walker-Estes Corporation, Oklahoma City, Okla.

[21] Appl. No.: 692,386

[22] Filed: Apr. 29, 1991

[51] Int. Cl.⁵ ........................................... H03M 11/20
[52] U.S. Cl. ..................................... 341/26; 400/100; 341/22
[58] Field of Search ................. 341/22, 26; 400/88, 400/91, 94, 100, 482, 485; 178/17 C, 79

[56] References Cited

U.S. PATENT DOCUMENTS

| | | | |
|---|---|---|---|
| 4,042,777 | 8/1977 | Bequaert et al. | 179/79 |
| 4,140,039 | 2/1979 | Faulkner | 84/715 |
| 4,344,069 | 8/1982 | Prame | 341/26 |
| 4,443,789 | 4/1984 | Endfield et al. | 341/22 |
| 4,467,321 | 8/1984 | Volnak | 341/22 |
| 4,549,279 | 10/1985 | Lapeyre | 364/709 |
| 4,555,193 | 11/1985 | Stone | 400/486 |
| 4,638,306 | 1/1987 | Rollhaus et al. | 400/100 |
| 4,680,572 | 7/1987 | Mequiro et al. | 400/485 X |
| 4,694,280 | 9/1987 | Rollhaus et al. | 400/100 |
| 4,761,522 | 8/1988 | Allen | 200/5 R |
| 4,763,252 | 8/1988 | Rose | 364/200 |
| 4,791,408 | 12/1988 | Heusinkveld | 400/479 |
| 4,831,218 | 5/1989 | Wright | 200/5 A |
| 4,833,446 | 5/1989 | Eilam et al. | 341/22 |
| 4,836,700 | 6/1989 | Jensen | 400/489 |
| 4,849,732 | 7/1989 | Dolenc | 341/20 |
| 4,891,777 | 1/1990 | Lapeyre | 364/706 |
| 4,911,565 | 3/1990 | Ryan | 400/100 |
| 4,918,631 | 4/1990 | Hara et al. | 364/708 |
| 4,937,778 | 6/1990 | Wolf et al. | 364/900 |
| 4,974,183 | 11/1990 | Miller | 364/709.12 |
| 4,994,992 | 2/1991 | Lapeyre | 364/709.15 |

Primary Examiner—Donald J. Yusko
Assistant Examiner—Michael Horabik
Attorney, Agent, or Firm—David Newman & Associates

[57] ABSTRACT

A chordal keyboard method and apparatus for generating a key code using a plurality of keys coupled to a controller with a first set of registers and a second set of registers. A user depresses at least one of the plurality of keys. The controller detects, which of the plurality of keys are in a depressed position and which of the plurality of keys are released from the depressed position. The controller sets in the first set of registers and sets in the second set of registers, bit locations of respective depressed keys, and clears in the second set of registers bit locations of respective released keys. When the controller detects that all of the plurality of keys are in a released position, a key code is generated which corresponds to bit locations set in the first set of registers. After generating the key code, the controller clears the first set of registers.

14 Claims, 4 Drawing Sheets

CHORDAL KEYBOARD METHOD AND APPARATUS

BACKGROUND OF THE INVENTION

The present invention relates to a method and apparatus for a chordal keyboard and particularly a chordal keyboard which has key sensors actuated or sensed in a depressed position and a released position.

DESCRIPTION OF THE RELATED ART

A recent book, *Input Devices*, edited by So contains a chapter on keyboards by Joel Greenstein of Clemson University and William Muto of Texas Instruments, in which chord keyboards are discussed.

Chord keyboards require simultaneous presses of two or more keys to generate many of their characters. This enables a small number of keys to generate a relatively large set of characters . . . To use the keyboard effectively, the operator must learn the set of relationships between characters and chords.

. . . In absence of any standards based on previous experience, future implementations must address a number of design issues. Appropriate numbers of keys and key locations must be determined and the relationships between characters and chords must take into account the learning, retention, and execution capabilities of the user. Greenstein and Muto, "Keyboards," Sol Sherr, ed., *Input Devices*, Academic Press, Inc., Boston, 1988: Section 3.4.2 "Chord Keyboards," p. 144.

Choral keyboards have an advantage of simplicity of construction and use and a "touch-type" facility that enables the keyboard to be used as a data input device. The motor skills needed to operate chordal keyboards are neither rare nor hard to acquire. Apparently the task of memorizing up to 100 chord combinations is within the capability of most users. According to an early report H. P. VanCott, ed., *Human Engineering Guide to Equipment Design*, Department of Defense, Washington, D.C., 1972, p. 328, the potential of chordal keyboard data entry was seen as very high, indicating entry rates of 150% of standard typing as being relatively easy to achieve. However, others report more recently that ". . . not a great deal of work has yet been devoted to optimizing the chordal keyboard for alphanumeric data entry." Greenstein and Muto, "Keyboards," *Input Devices*, S. Sherr, ed., Academic Press, Boston, 1988, p. 148. Reasons suggested by the literature for the failure of prior art chordal keyboards to achieve commercial success include what is referred to herein as the "association" problem and the "transition" problem.

Design issues which must be addressed in developing a chordal keyboard include determining the appropriate numbers of keys, and determining key locations along with their relationships between the characters and the chords. The design must take into account three factors: learning, retention, and execution capabilities of the user. Greenstein and Muto, "Keyboards," in *Input Devices*, S. Sherr, ed., Academic Press, Boston, 1988, p. 148. Because most languages have characters with high probability of use, this observation has been employed to associate such characters with simple key combinations. Such statistical methods of association assume ". . . that letters and fingers are matched by repetition and frequency of use and not by alphabetic order." Kirschenbaum, et. al., "Chordic Keyboard for Disabled," *Human Factors*. vol. 28(2), The Human Factors Society, 1986, p. 190. One study, however, suggests the inferiority of alphabetically organized keyboards for novice users as compared with a randomly organized keyboard and the standard Sholes keyboard, but explains that inferior performance of alphabetic keyboards was due to the combined effort of mental processing and visual search required for novice users. Norman and Fisher, "Why Alphabetic Keyboards Are Not Easy to Use: Keyboard Layout Doesn't Much Matter," Human Factors, vol. 24(5), The Human Factors Society, 1982, p. 509. Matching characters with key combinations according to probable frequency of use may show a slight advantage with regard to higher rates of execution by experienced users, but any such advantage is lost to occasional users. In fact, the occasional user may be denied access if such associations cannot be remembered or logically regenerated. The prior art teaches that other methods have attempted to address the problem of associating characters with key combinations. A keyboard and apparatus and method disclosed in U.S. Pat. No. 4,833,446, to Eilam et. al. "Keyboard Apparatus and Method," May 23, 1989, cites the association problem among possible reasons why previous chordal keyboards have not met with commercial success:

(1) The large code set makes learning difficult and time consuming and retraining time significant, (2) The code set which associates the letters and symbols with key combinations is not selected for motoric ease, particularly in transitions between letters often occurring together, (3) Symbols and numbers have their own codes which must be learned in addition to the letter codes, (4) Even where a mnemonic link is provided between functions and alphabet letters, the key location combinations are different, even though the finger combinations are the same, (5) The total number of symbols and control instructions is severely limited . . .

An alternative method of association is described in U.S. Pat. No. 4,360,892, to Cyril Endfield., "Portable Word-Processor," issued Nov. 23, 1982, for a portable word processor. Endfield's method employs a geometrical association concept in which the shape of a letter or other symbol to be coded has a certain geometrical resemblance to the configuration of key combinations. It should be noted that methods for symbol and key associations which rely on geometric concepts or frequency of use probabilities are limited to a particular character set or alphabet.

A ternary chord-type keyboard disclosed in U.S. Pat. No. 4,775,255 to L. W. Langley, "Ternary Chord-Type Keyboard,", issued Oct. 4, 1988, provides background information regarding the "transition problem" associated with multiple active key states:

. . . the transitions from state to state are as important as the individual states themselves. When assigning keyboard states to characters, the designer of a chord keyboard must try to avoid assigning a character to any state which is liable to occur by accident between any two valid states. This constraint is an important one, because during entry of text or other data, any sequence of two valid characters may occur. Premature release or early operation of one of the keys in a combination is extremely likely to result in an unwanted entry. As the operator's skill and speed increase, this problem becomes even more severe. Anyone who has operated a chord-type keyboard with ten or fewer keys can testify to the necessity for extreme car and precise timing. The problem of unwanted combinations occurring during transitions is likely to have been the most significant deterrent to adoption and use of chord-type keyboards with 10 or fewer keys.

Previous attempts to solve the key state transition problem include a mechanism to inhibit recognition of any new character until a delay, started by the first switch closure, has timed out. Such a delay must be long enough to inhibit errors, but not long enough to slow the entry process. Examples of prior art timing constraints can be seen in a patent for a data entry system issued to Jensen and in a patent for chordal entry keying of data fields issued to Meguire and Pitoniak. In the Jensen example:

Note that an operator must adhere to some timing constraints when using the chord keyboard. In the above example, if stroke 2 had followed stroke 1 almost immediately, e.g., within 20 milliseconds, then stroke 1 would not have been recognized as an independent stroke. U.S. Pat. No. 4,836,700 to P. S. Jensen, "Data Entry System," issued Jun. 6, 1989, at col. 3, line 59.

In the Meguire and Pitoniak example:

Depression of a numeric or alpha key within 60 milliseconds of an entry key is permitted for decoding of the data as the last key of the current data field. In a time frame between 60 and 100 milliseconds, a warning tone is received for purposes of verifying the last data field entry and to allow the operator to monitor timing performance. U.S. Pat. No. 4,680,572 to Meguire and Pitoniak, "Chord Entry Keying of Data Fields," issued Jul. 14, 1987.

A method and apparatus for character generation is disclosed in U.S. Pat. No. 4,344,069, to E. S. Prame, "Method and Apparatus for Character Generation," issued Aug. 10, 1982, describes two embodiments which limit the number of keys used to form alphabetical characters as part of a strategy to solve the transition problem. "In an alphabetical mode, two keys are depressed in a sequence in such a way that the first key will not be released before the second key is depressed." (col. 3, line 34). An embodiment which permits up to three keys depressed in sequence is also described: ". . . the character generator should be able to generate a number of character codes represented by one key code, two key codes or three key codes" (col 6, line 14). It should be noted that limiting the number of keys used to form chords limits the size of the character set which can be associated with key combinations. It also should be noted that a further limitation imposed by the Prame method requires the user to depress the keys in a sequence. The Prame patent also describes an "all keys released" test in addition to a "number of key depressed" test to further address the transition problem. The "all keys released" control signal is coupled to logic that senses a particular number of keys depressed and transfer of control from a status logic circuit to a character generator circuit ". . . does not necessarily need to happen in connection with a gate signal on [the all keys released line]" (col. 5, lines 40-44).

Excessive demands for precision of motion and timing imposed by the prior art, along with an excessively long training period to build speed and accuracy are among the reasons why prior art chord keyboards have not replaced the conventional Sholes keyboard. U.S. Pat. No. 4,775,255, to L. W. Langley, "Ternary Chord-Type Keyboard," issued Oct. 4, 1988.

OBJECTS OF THE INVENTION

A general object of the invention is an improved method and apparatus for a chordal keyboard which permits any number of keys, including all keys, to be depressed and released simultaneously or sequentially in any sequence and a valid character code generated.

Another object of the invention is a common method of associating symbols with key locations for all character sets, alphabets or languages.

A further object of the invention is an improved method and apparatus for a chordal keyboard in which the circuits are simplified.

SUMMARY OF THE INVENTION

According to the present invention, as embodied and broadly described herein, a chordal keyboard method and apparatus for generating a key code using a plurality of keys is provided. The keys are coupled to a controller, which has a first set of registers and a second set of registers. The method and apparatus respond to a user depressing at least one of the plurality of keys. The controller detects which of the plurality of keys are in a depressed position. The controller then sets, in the first set of registers and in the second set of registers, symbol locations of respective depressed keys. The controller also detects which of the plurality of keys are released from the depressed position. The controller then clears, in the second set of registers, symbol locations of respective released keys. The controller detects when all of the plurality of keys are in a released position. Upon detecting that all of the plurality of keys are in the released position, the controller generates a key code corresponding to symbol locations set in the first set of registers. After generating the key code, the controller clears the first set of registers and the second set of registers. The term "symbol", as used herein, is defined as a storage location in a register for one or more bits.

The keyboard of the present invention, which has key sensors actuated or sensed in accordance with a binary reflected Gray code, increases speed, provides rapid processing, and provides flexible adaptation to a plurality of character sets. Relevant prior art is generally directed towards the layout of the keyboard or scanning methods for the keyboard. It is well recognized that neither scanning of the keyboard nor association of character and key combinations by a probable frequency of use employs the binary reflected Gray code. The method of the present invention provides learning, retention, and execution capabilities of the user, in that character sets are usually learned sequentially; therefore, a sequential, repeating, pattern of key combinations can be more easily associated and retained than an arbitrary assignment of symbols to key combinations.

The keyboard of the present invention is characterized by a small number of keys suitable for typing large amounts of data at high speed. Furthermore, the keyboard can handle a much larger symbol set than any reasonably-sized conventional keyboard. Because it is so small and mechanically simple, the keyboard costs less to manufacture than a conventional keyboard.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
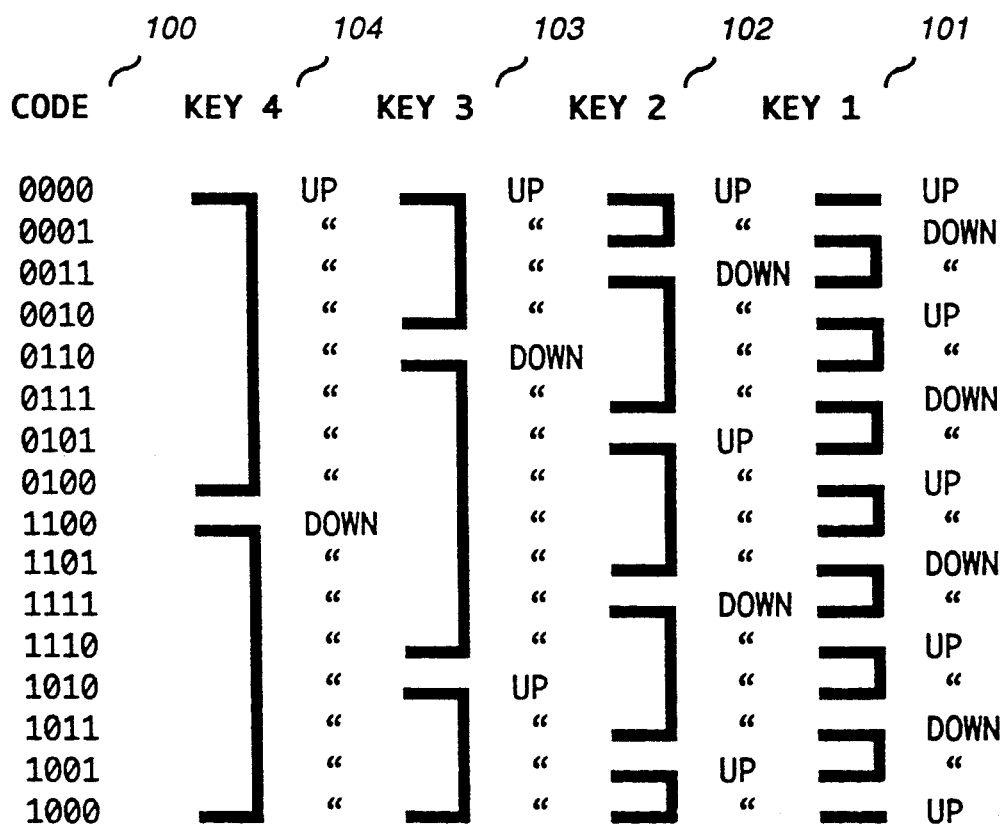
FIG. 1 is a diagram which illustrates a 16-element Gray code sequence in accordance with the present invention.

Reference will now be made in detail to the present preferred embodiments of the invention, examples of which are illustrated in the accompanying drawings, wherein like reference numerals indicate like elements throughout the several views.

The method of the invention relies on the primary form of the reflected Gray code as disclosed in U.S. patent application by Estes and Walker entitled "Mixed-Resolution, N-Dimensional Object Space Method and Apparatus" having Ser. No. 07/642,508, filing date of Jan. 16, 1991, which is incorporated herein by reference. Key sensors are actuated or sensed, and key combinations are determined in accordance with a particular form of binary Gray code called the primary form of the reflected binary code. This particular code sequence iterates in a highly repetitive pattern that is easy to learn, remember, and execute. Consider repetitive transition pattern in the 4-key (16 element) reflected Gray code sequence shown in FIG. 1. The columns labeled key 1 101 through key 4 104 correspond to positions in the key codes listed in column 1 100. A key up corresponds to a logic zero in the key code 100 and a key down corresponds to a logic one.

The intuitive repeating pattern of the primary reflected Gray code sequence contemplated by the present invention is easily generated and logically associated with any sequential character set. The principal concept is that because character sets, like numeric sequences, are learned in a particular order, a set of key code combinations that demonstrate a repetitive pattern can be more readily associated with other sequences. Since hand motion between and within rows of keys is eliminated, the visual search plus mental process of key location is reduced to a mental association process that may be more easily learned, retained, and executed by occasional users. By having a "universal" sequence that "maps" the same way to all character sets, the basic keyboard mechanism is common to all language implementations.

The transition problem, previously described, is cited in the literature as a factor in the limited success of prior art chord keyboards. The method of the present invention relies solely on determination of an all-keys-up state after one or more keys are depressed to solve the transition problem. The patent issued to Prame describes two embodiments of a chordal keyboard which limit the number of keys used to form alphabetical characters as part of a strategy to solve the transition problem. "In an alphabetical mode, two keys are depressed in a sequence in such a way that the first key will not be released before the second key is depressed." (Prame, col. 3, line 34) In the method or the present invention a collection of keys can be depressed and released simultaneously or sequentially in any sequence and a correct character code will be generated. It should also be noted that the present invention permits any number of keys, including all keys, to be depressed and released simultaneously or sequentially in any sequence. The Prame patent also describes an "all keys released" test in addition to a "number of keys depressed" test to further address the transition problem. The "all keys released" control signal is coupled to logic that senses a particular number of keys depressed and transfers control from a status logic circuit to a character generator circuit ". . . does not necessarily need to happen in connection with a gate signal on [the all keys released line]." As set forth below, the keyboard of the present invention relies only on the "all keys released" signal to control chord transitions, regardless of the number of keys used to form a chord, or the sequence in which the keys were depressed or released.

Figure 2:
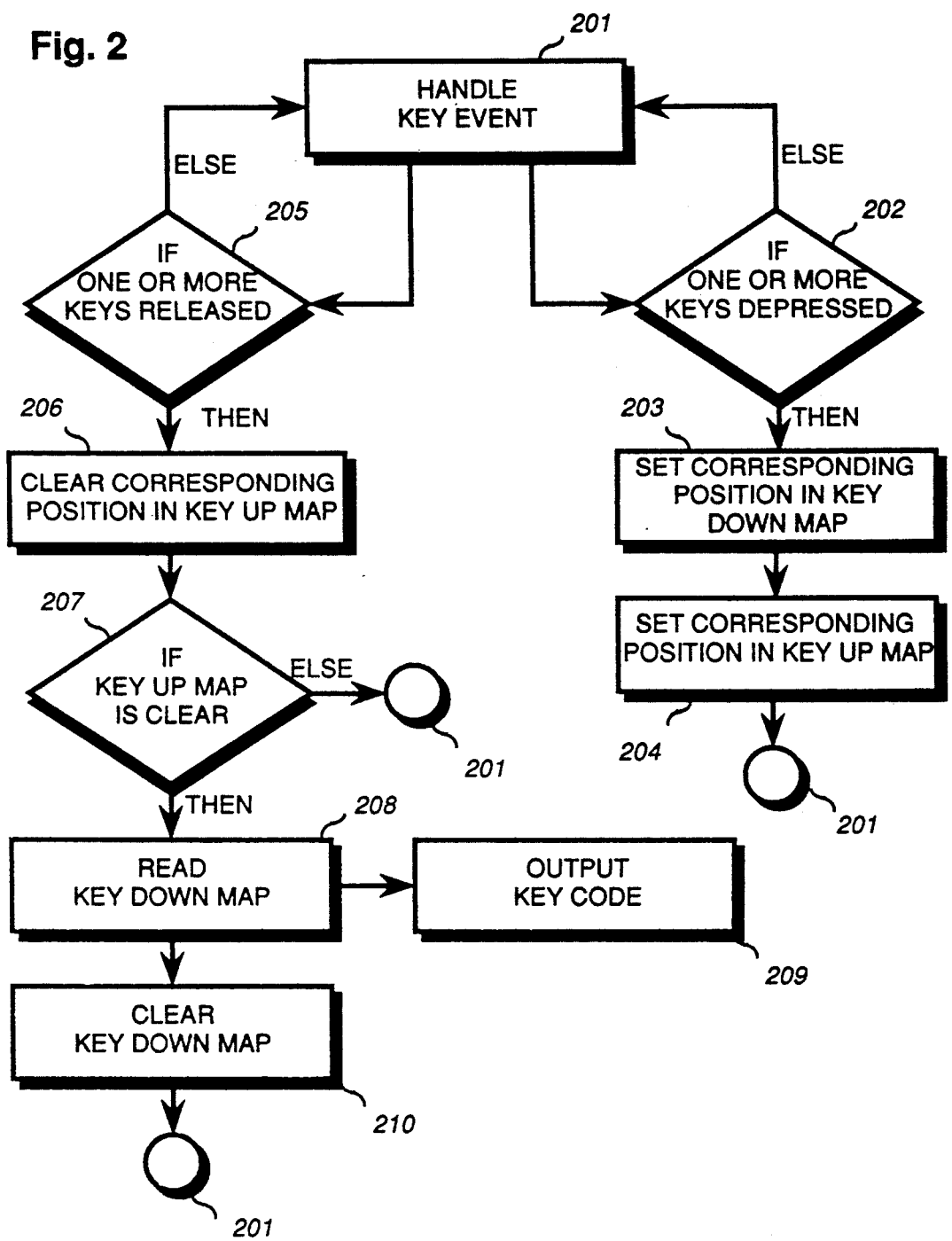
FIG. 2 is a flow diagram which illustrates a method for generating a key code in accordance with the present invention.

FIG. 2 is a flow diagram which illustrates a method for generating a key code in accordance with the present invention. A key event is defined in accordance with the present invention as the simultaneous or sequential activation or release of one or more keys 201.

Figure 3:
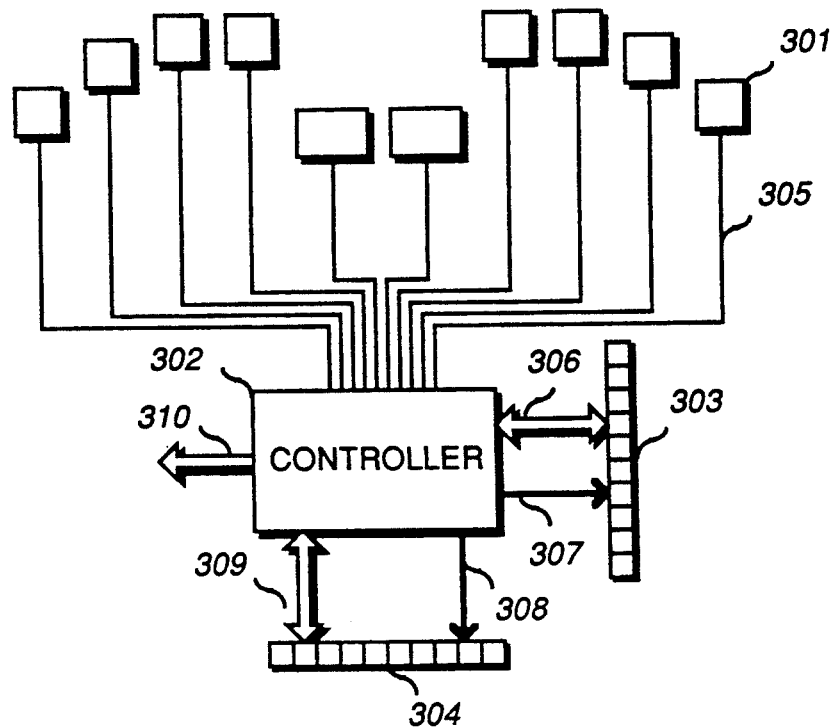
FIG. 3 illustrates a keyboard layout and a block diagram of a keyboard having control circuits in accordance with the present invention.

In the exemplary arrangement shown in FIG. 2, a chordal keyboard method for generating a key code using a plurality of keys is provided. FIG. 3 illustrates the chordal keyboard apparatus. In FIG. 3, the plurality of keys 301 are coupled to a controller 302, which has or is coupled to a first set of registers 303 and a second set of registers 304. The method of FIG. 2 includes the steps of depressing 201 at least one of the plurality of keys 301. The controller 302 detects 202 which of the plurality of keys are in a depressed position. The controller then sets 203 in the first set of registers 303 and sets in the second set of registers 304, symbol locations of respective depressed keys. The first set of registers 303 serves as a key down map. The controller 302 also detects 205 which of the plurality of keys are released from a depressed position. The controller then clears 206 in the second set of registers 304, symbol locations of respective released keys. The second set of registers 304 serves as a key up map. The controller 302 detects 207 when all of the plurality of keys are in a released position. When the controller 302 detects 207 that all of the plurality of keys are in the released position, the controller 302 reads the first set of registers 303 and generates 209 a key code corresponding to symbol locations set in the first set of registers 303. After generating 209 the key code, the controller clears 210 the first set of registers 303 and the second set of registers 304 and the method repeats with a user depressing 201 one or more keys.

Briefly, the method sensing a key event: If 202 one or more keys are depressed, then 203 set the corresponding position in the key down map, and 204 set the corresponding position in the key up map, and 201 handle the next key event; else 205 if one or more keys are released, then 206 clear the corresponding position in the key up map. If 207 the key up map is clear (e.g., "all keys released") and 208 get the contents of the key down map, and 209 generate the key code, and 210 clear the key down map.

The present invention also may be embodied as a chordal keyboard apparatus for generating a key code. The apparatus includes a plurality of keys 301, first means for storing data, second means for storing data, and controller means. The controller means detects keys of the plurality of keys 301 in a depressed position and sets symbol locations in the first storing means and in the second storing means, of the respective depressed keys. The controller means also detects which of the plurality of keys 301 are released from the depressed position and clears symbol locations in the second storing means. When the controller means detects that all of the plurality of keys are in a released position, the controller means generates a key code corresponding to the set symbol locations in the first storing means. The controller means subsequently clears the first storing means and the second storing means. Symbol locations as used herein include storage locations in first means or second means for one or more bits.

The controller means may be embodied as controller 302. The first storing means may be embodied as the first set of registers 303, and the second storing means may be embodied as a second set of registers 304. Additionally, the controller means may further include means for generating the key code from a binary reflected Gray code.

As shown in FIG. 3, controller means and first and second set of registers 303, 304 are employed for sensing and storing key press/release states to control the presentation of key codes 310 in response to one or more key activations. The preferred embodiment incorporates ten keys 301, one for each finger and thumb. It should be noted that a symmetrical arrangement of the keys 301 allows the mode of operation for the keyboard to be selected by the user as being either right-handed or left-handed. An alternative embodiment for a hand-held device predetermines the mode of operation by providing a set of grip-operated keys 301 in lieu of, or in addition to, a set of conventional keys 301. U.S. Pat. No. 4,791,408 to, P. Heusinkveld, "Keyboard for One-Hand Operation,", issued Dec. 13, 1988, describes a keyboard for one-hand operation which employs a set of five grip-operated keys. The keys 301 of FIG. 3 are connected by signal lines 305 to a controller circuit 302. The controller 302 is connected by data lines 306, 309, and by control lines 307, 308 to first and second sets of registers 303, 304. Each of the first and second set of register 303, 304 includes a number storage cells corresponding to the number of keys 301 in a given keyboard arrangement. A key down register 304 records the "key closed" state for all keys pressed to form a chord of key combinations representing a valid key code. A key up register 303 records a copy of the "key closed" state for all keys pressed and subsequently clears each storage cell upon release of its associated key 301.

Figure 4:
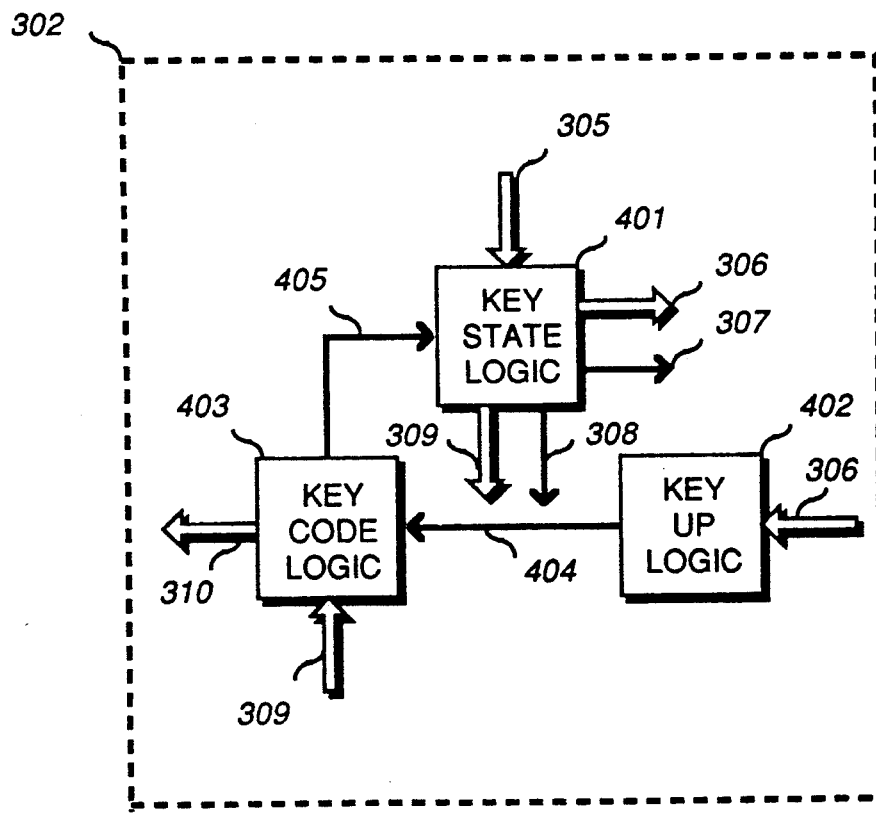
FIG. 4 shows a block diagram of a keyboard control circuit for controlling keyboard operations in accordance with the present invention.

FIG. 4 illustrates a block diagram of a keyboard control circuit for controller 302 for controlling keyboard operations in accordance with the present invention. The key state logic circuit 401 is connected to the keys 301 by a set of signal lines 305; the key state logic circuit 401 is also connected to a key up register 303 by data lines 306 and by control lines 307; and the key state logic circuit 401 is further connected to a key down register 304 by data lines 309 and by control lines 308.

Key activations 301 sensed on the key event signal lines 305 by the key state logic circuit 401 are transferred along data channels 306, 309 to storage registers 303, 304. Control lines 307 which connect the key state logic circuit 401 and the key up register 303 distinguish between "key closed" and "key released" states. Control lines 307, 308 also connect the key state logic circuit 401 and the storage registers 303, 304 for the purpose of setting them to an initial "all keys released" state. The key state logic circuit 401 also comprises additional memory means for buffering key state events associated with a next key code if they occur prior to the completion of processing related to a previous key code. Such overlapping of key code events is referred to in the literature as rollover.

The key up logic circuit 402 of FIG. 4 is connected to a key up register 303 by data lines 306 and to the key code logic circuit 403 by control line 404. When the key up logic circuit 402 senses the "all keys released" state on data lines 306, an "all keys released" signal is transferred on control line 404 to the key code logic circuit 403. The key code logic circuit 403 is further connected to a key down register 304 by data lines 309 and to the key state logic circuit 401 by control line 405. When an "all keys released" signal on control line 404 is sensed by the key code logic circuit 403; a "disable key events" signal is transferred to the key state logic circuit 401 by control line 405; the contents of the key down register 304 are transferred over data lines 309; the key code logic circuit 403 generates a key code on the output data lines 310; then an "enable key events" signal is transferred to the key state logic circuit 401 by control line 405.

Figure 5:
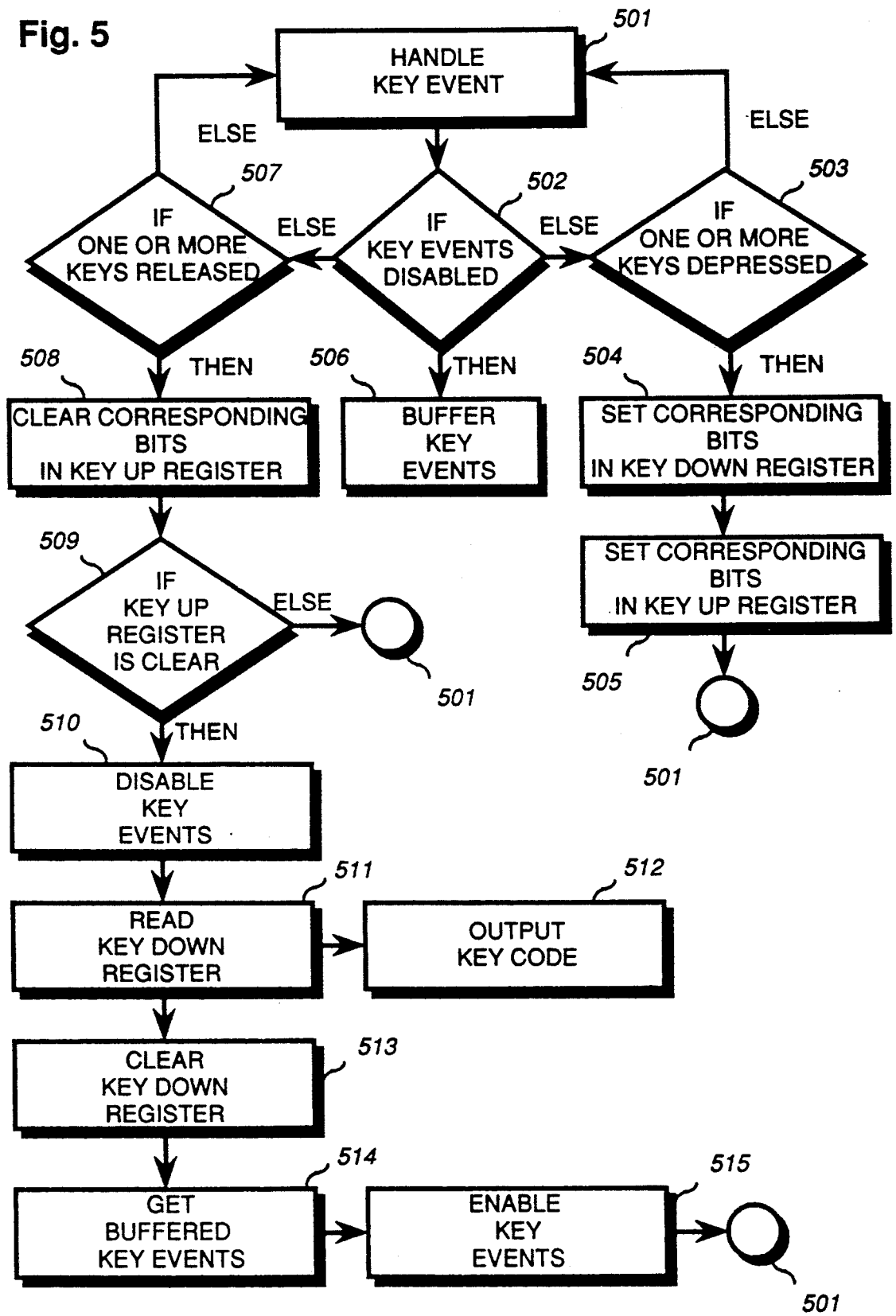
FIG. 5 is a flow diagram which illustrates a method for controlling keyboard operations in accordance with the present invention.

FIG. 5 is a flow diagram which illustrates a method for controlling keyboard operations in accordance with the present invention. A key event is defined in accordance with the present invention as the simultaneous or sequential activation or release of one or more keys 501. On sensing a key event, the keyboard control circuit 502 determines the event handler 501 status:

If 502 key events are disabled,
then 506 buffer key events;
else 503 if one or more keys 301 are depressed,
then 504 set the corresponding bit(s) in the key down register 304,
and 505 set the corresponding bit(s) in the key up register 303,
and 501 handle the next key event;
else 507 if one or more keys 301 are released,
then 505 clear the corresponding bit(s) in the key up register 303.

If 509 the key up register 303 is clear (e.g., "all keys released")
then 510 disable key events,
and 511 get the contents of the key down register 304,
and 512 generate the key code,
and 513 clear the key down register 304,
and 514 handle buffered key events,
and 515 enable key events.

It will be apparent to those skilled in the art that various modifications ca be made to the chordal keyboard method and apparatus of the instant invention without departing from the scope or spirit of the invention, and it is intended that the present invention cover modifications and variations of the chordal keyboard method and apparatus provided they come within the scope of the appended claims and their equivalents.

I claim:

1. A method for generating a key code using a plurality of keys coupled to a controller with a first set of registers and a second set of registers, comprising the steps, using said plurality of keys, said first set of registers and said second set of registers, of:
   depressing at least one of said plurality of keys;
   detecting, using said controller, which of said plurality of keys are in a depressed position;
   setting, using said controller, in said first set of registers, bit locations of respective depressed keys;
   setting, using said controller, in the second set of registers, bit locations of respective depressed keys;
   detecting, using said controller, which of said plurality of keys are released from the depressed position;
   clearing, using said controller, in said second set of registers, bit locations of respective released keys;
   detecting all of said plurality of keys in a released position;
   generating, responsive to detecting all of said plurality of keys in the released position, a key code responsive to bit locations set in said first set of registers; and
   clearing, after generating the key code, said first set of registers and said second set of registers.

2. The method as set forth in claim 1 wherein said generating step includes the step of generating the key code from a binary reflected Gray code.

3. The method as set forth in claim 1, wherein the first set of registers of said controller maps which of said plurality of keys are in a depressed position, and the second set of registers of said controller maps which of said plurality of keys are released from a depressed position, for buffering key code events to avoid rollover of key code events.

4. A method for generating a key code using a plurality of keys coupled to a controller with a first set of registers and a second set of registers, comprising the steps of:
   depressing at least one of said plurality of keys;
   detecting, using said controller, which of said plurality of keys are in a depressed position;
   setting, using said controller, in said first set of registers, symbol locations of respective depressed keys;
   setting, using said controller, in the second set of registers, symbol locations of respective depressed keys;
   detecting, using said controller, which of said plurality of keys are released from the depressed position;
   clearing, using said controller, in said second set of registers, symbol locations of respective released keys;
   detecting all of said plurality of keys in a released position;
   generating, responsive detecting to all of said plurality of keys in the released position, a key code responsive to symbol locations set in said first set of registers; and
   clearing, after generating the key code, said first set of registers and said second set of registers.

5. The method as set forth in claim 4 wherein said generating step includes the step of generating the key code from a binary reflected Gray code.

6. The method as set forth in claim 4, wherein the first set of registers of said controller maps which of said plurality of keys are in a depressed position, and the second set of registers of said controller maps which of said plurality of keys are released from a depressed position, for buffering key code events to avoid rollover of key code events.

7. A chordal keyboard for generating a key code comprising:
   a plurality of keys;
   a first set of registers;
   a second set of registers;
   a controller operatively coupled to said plurality of keys, said first set of registers and said second set of registers, said controller responsive to detecting keys of said plurality of keys in a depressed position for setting bit locations in said first set of registers and sets in the second set of registers, said controller responsive to detecting keys of said plurality of keys released from a depressed position for clearing bit locations in said second set of registers, and said controller responsive to detecting all of said plurality of keys released from a depressed position for generating a key code from said set bit locations in said first set of registers and subsequently clearing said first set of registers.

8. The chordal keyboard as set forth in claim 7 wherein said controller includes means for generating the key code from a binary reflected Gray code.

9. The chordal keyboard as set forth in claim 7, wherein said first set of registers maps which of said plurality of keys are in a depressed position, and said second set of registers maps which of said plurality of keys are released from a depressed position, for buffering key code events to avoid rollover of key code events.

10. A chordal keyboard for generating a key code comprising:
    a plurality of keys;
    first means for storing data;
    second means for storing data;
    controller means responsive to detecting keys of said plurality of keys in a depressed position for setting symbol locations in said first storing means, responsive to detecting keys of said plurality of keys released from a depressed position for clearing symbol locations in said second storing means, and responsive to detecting all of said plurality of keys released from a depressed position for generating a key code from the set symbol locations in said first storing means and subsequently clearing said first storing means.

11. The chordal keyboard as set forth in claim 10 wherein:
    said first storing means includes a first set of registers; and
    said second storing means includes a second set of registers.

12. The chordal keyboard as set forth in claim 10 wherein said controller includes means for generating the key code from a binary reflected Gray code.

13. The chordal keyboard as set forth in claim 10, wherein said first means for storing data maps which of said plurality of keys are in a depressed position, and said second means for storing data maps which of said plurality of keys are released from a depressed position, for buffering key code events to avoid rollover of key code events.

14. The chordal keyboard as set forth in claim 13, wherein:
    said first storing means includes a first set of registers; and
    said second storing means includes a second set of registers.

* * * * *